United States Patent
Bachmann et al.

(10) Patent No.: US 10,552,539 B2
(45) Date of Patent: Feb. 4, 2020

(54) DYNAMIC HIGHLIGHTING OF TEXT IN ELECTRONIC DOCUMENTS

(71) Applicant: SAP SE, Walldorf (DE)

(72) Inventors: Juergen Bachmann, Wilhelmsfeld (DE); Otto Kuehn, Heidelberg (DE); Vladislav Leonkev, Walldorf (DE)

(73) Assignee: SAP SE, Walldorf (DE)

( * ) Notice: Subject to any disclaimer, the term of this patent is extended or adjusted under 35 U.S.C. 154(b) by 606 days.

(21) Appl. No.: 14/972,678

(22) Filed: Dec. 17, 2015

(65) Prior Publication Data

US 2017/0177180 A1    Jun. 22, 2017

(51) Int. Cl.
| G06F 17/27 | (2006.01) |
| G06F 17/21 | (2006.01) |
| G06F 3/0484 | (2013.01) |
| G06F 3/0482 | (2013.01) |

(52) U.S. Cl.
CPC .......... *G06F 17/278* (2013.01); *G06F 3/0482* (2013.01); *G06F 3/04842* (2013.01); *G06F 17/21* (2013.01); *G06F 17/211* (2013.01); *G06F 17/2785* (2013.01)

(58) Field of Classification Search
CPC .. G06F 3/0484; G06F 3/0482; G06F 3/04842; G06F 17/211; G06F 17/278; G06F 17/2785; G06F 17/30011; G06F 17/30696; G06F 17/21
See application file for complete search history.

(56) References Cited

U.S. PATENT DOCUMENTS

| 5,278,980 | A | * | 1/1994 | Pedersen | G06F 16/3325 |
| 5,526,443 | A | * | 6/1996 | Nakayama | G06F 17/30616 |
| | | | | | 382/173 |
| 6,026,409 | A | * | 2/2000 | Blumenthal | G06F 17/30696 |
| 6,038,561 | A | * | 3/2000 | Snyder | G06F 17/30011 |
| 6,839,702 | B1 | * | 1/2005 | Patel | G06F 17/30905 |
| 7,539,611 | B1 | * | 5/2009 | Wyckoff | G06F 17/271 |
| | | | | | 704/1 |
| 8,402,030 | B1 | * | 3/2013 | Pyle | G06F 17/30675 |
| | | | | | 707/738 |
| 9,886,159 | B2 | * | 2/2018 | Fox | G06F 3/0481 |
| 2006/0282415 | A1 | * | 12/2006 | Shibata | G06F 17/30011 |
| 2009/0228817 | A1 | * | 9/2009 | Adams | G06F 17/30696 |
| | | | | | 715/767 |

(Continued)

*Primary Examiner* — Nicholas Ulrich
(74) *Attorney, Agent, or Firm* — Andrew Jung-Min Lee; Fountainhead Law Group PC

(57) ABSTRACT

Techniques for dynamically highlighting text in electronic documents are provided. In a first set of embodiments, a computing device can, upon presenting an electronic document to a user, receive a user selection of an entity associated with the document. The entity can represent a category of terms deemed relevant to the electronic document, where a term is a word or a combination of word(s) and/or punctuation(s) that have semantic significance. In response, the computing device can automatically highlight terms in the presented document that belong to the selected entity. In a second set of embodiments, the computing device can, upon presenting the electronic document to the user, receive a user selection of a word in the document. In response, the computing device can automatically highlight terms in the presented document that include the selected word, as well as other terms that are related to those terms.

13 Claims, 14 Drawing Sheets

(56) References Cited

U.S. PATENT DOCUMENTS

| | | | | |
|---|---|---|---|---|
| 2011/0119262 A1* | 5/2011 | Dexter | ................ | G06F 16/951 |
| | | | | 707/726 |
| 2011/0258194 A1* | 10/2011 | Yang | ................ | G06F 17/30011 |
| | | | | 707/740 |
| 2012/0204104 A1* | 8/2012 | Walsh | ............... | G06F 17/30705 |
| | | | | 715/273 |
| 2013/0138425 A1* | 5/2013 | Luke | .................. | G06F 17/2705 |
| | | | | 704/9 |
| 2014/0223284 A1* | 8/2014 | Rankin, Jr. | .......... | G06F 17/248 |
| | | | | 715/234 |
| 2015/0113388 A1* | 4/2015 | Barrett | ............... | G06F 17/3053 |
| | | | | 715/249 |
| 2015/0169745 A1* | 6/2015 | Morimoto | ............. | G06Q 10/10 |
| | | | | 707/730 |
| 2016/0048491 A1* | 2/2016 | Landau | ............... | G06F 17/241 |
| | | | | 715/231 |

\* cited by examiner

DYNAMIC HIGHLIGHTING OF TEXT IN ELECTRONIC DOCUMENTS

BACKGROUND

Reading text in electronic documents such as e-mails, web pages, PDF (Portable Document Format) files, and the like is a task that many people perform on a routine basis. In cases where the electronic documents to be read are large and/or significant in number, it can be time-consuming to thoroughly ascertain the nature of each document's content due to the need to read (or at the very least, skim) through the entireties of the documents. Accordingly, it would be useful to have computer-implemented techniques that allow individuals to more quickly and efficiently comprehend and extract textual information from electronic documents.

SUMMARY

Techniques for dynamically highlighting text in electronic documents are provided. In a first set of embodiments, a computing device can, upon presenting an electronic document to a user, receive a user selection of an entity associated with the document. The entity can represent a category of terms deemed relevant to the electronic document, where a term is a word or a combination of word(s) and/or punctuation(s) that have semantic significance. In response, the computing device can automatically highlight terms in the presented document that belong to the selected entity. In a second set of embodiments, the computing device can, upon presenting the electronic document to the user, receive a user selection of a word in the document. In response, the computing device can automatically highlight terms in the presented document that include the selected word, as well as other terms that are related to those terms.

The following detailed description and accompanying drawings provide a better understanding of the nature and advantages of particular embodiments.

BRIEF DESCRIPTION OF THE DRAWINGS

FIGS. 5A, 5B, 5C, and 6 depict example UIs illustrating entity-based dynamic highlighting according to an embodiment.

FIGS. 8, 9, and 10 depict example UIs illustrating word-based dynamic highlighting according to an embodiment.

DETAILED DESCRIPTION

Figure 1:
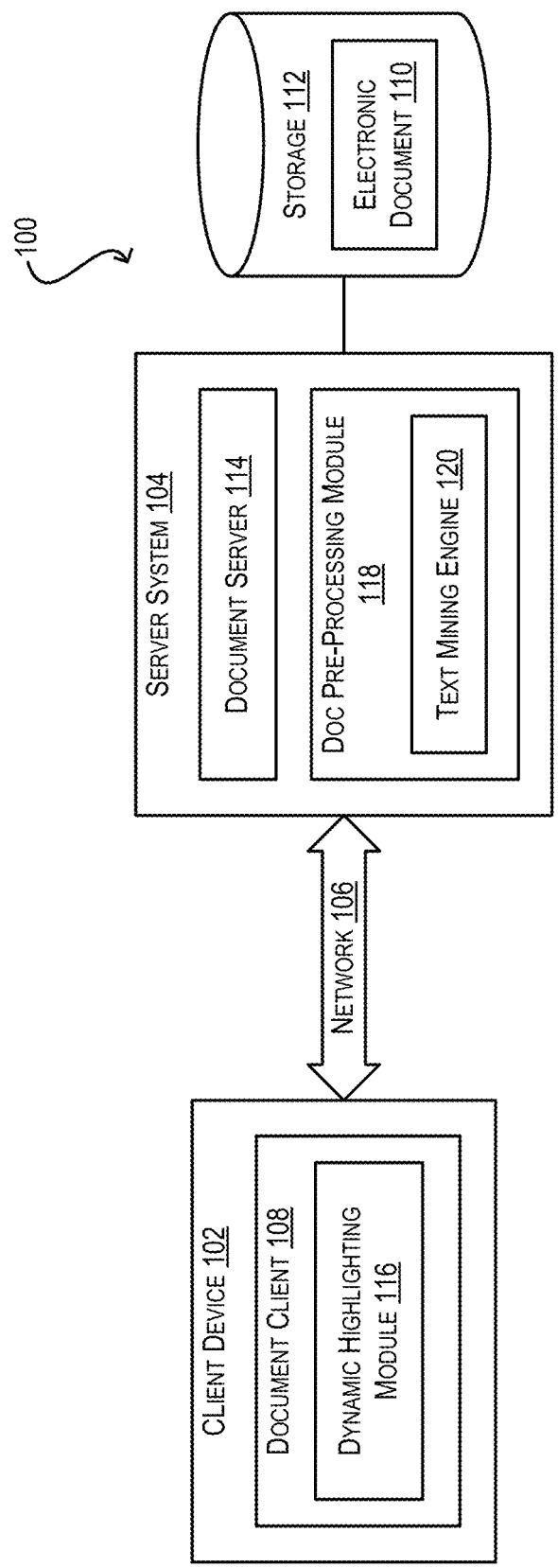
FIG. 1 depicts a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present disclosure provide techniques for dynamically highlighting text (e.g., terms) in an electronic document that is presented to a user via a client program running on a computing device, where the highlighted terms are deemed to be of potential interest to the user based on one or more user-initiated actions. As used herein, a "term" is a word or a combination of word(s) and/or punctuation(s) that have a meaning (in other words, designate something of semantic significance).

According to one set of embodiments, the client program can display to the user, via an appropriate user interface (UI), one or more selectable term categories (referred to as "entities") that are relevant to the presented electronic document. For example, the client program may display a first UI element for selecting a "Location" entity and a second UI element for selecting a "Person" entity. Upon receiving a selection of a particular entity from the user via activation of its corresponding UI element, the client program can automatically highlight (i.e., display with a different background and/or text color) all terms in the document that belong to the selected entity. For instance, if the Location entity described above is selected, the client program can automatically highlight all terms in the electronic document that are determined to designate a geographic location, such as "California," "Asia," "London," etc. Similarly, if the Person entity is selected, the client program can automatically highlight all terms in the electronic document that are determined to designate a person, such as "Barack Obama," "Vladimir Putin," "Gandhi," etc. In some embodiments, multiple entities may be selected simultaneously (e.g., both Location and Person), in which case the client program can highlight the terms for all of the selected entities using the same or different highlight colors. With this entity-based highlighting technique, the user can explore and extract textual information from the electronic document on a per-entity basis in a very short period of time.

According to another set of embodiments, the client program can allow the user to directly select (using a pointing mechanism such as a mouse, finger, etc.) a particular word in the presented electronic document that is of interest to the user. For example, the user may mouse-over or click on the word "Asia." In response to this selection, the client program can automatically highlight all terms in the electronic document that include the selected word, as well other terms that are determined to be "related" to those terms. For the purposes of this disclosure, two terms are related if the terms often appear together in documents/texts due to the nature of their content. If the selected word or term itself is an entity, then all sub-categories of this entity as well as all term members of this entity can also be highlighted. With this word-based highlighting technique, the user can quickly and easily find all instances of specific concepts and related concepts in the electronic document, without having to read or scan through the document in its entirety.

In both of the highlighting techniques above, the exact notation of words in the electronic document is not crucial; instead, these techniques can work independently of grammatical declension (e.g., inflection of nouns, pronouns, adjectives, and articles to indicate number, gender, case, etc.) by taking into account word stems rather than literal words. For example, in the case of the word-based highlighting technique, if the user selects the word "Asia," the client program may highlight all terms in which this exact word appears, as well as terms that include grammatical variants of the word (e.g., "asia," "Asia's," "asian," "asians," etc.).

Further, in certain embodiments, the word-based highlighting technique may be used concurrently with the entity-based highlighting technique, thereby providing the user with additional flexibility in terms of how he/she would like to explore and understand the text content of the electronic document.

These and other aspects of the present disclosure are described in further detail in the sections that follow.

1. System Environment

FIG. 1 depicts a system environment 100 in which the dynamic highlighting techniques of the present disclosure may be implemented according to an embodiment. As shown, system environment 100 includes a computing device (i.e., client device) 102 that is communicatively coupled with a server system 104 via a network 106 and is configured to run a document client program 108. Client device 102 can correspond to any type of computing device known in the art that has (or can connect to) a display for presenting electronic documents to end-users, such as a personal computer, a smartphone, a tablet, a smart TV, a cable box, a game/media console, etc. Document client 108 can be any proprietary or standards-based document presentation program, such as an e-mail client, a web browser, a word processor, etc. Although only a single client device 102 is shown for simplicity, it should be appreciated that multiple client devices may be in communication with server system 104, each being operated by different users or the same user.

In conventional operation, a user of client device 102 can transmit, via document client 108, a request to server system 104 for an electronic document 110 that is maintained on a server-side storage device/system 112 (or alternatively, in a non-persistent memory (e.g., RAM) of server system 104). The storage of electronic document 110 on storage 112 or in the RAM of server system 104 may be configurable by, e.g., an administrator of system 104. One example of such an electronic document is an HTML (HyperText Markup Language) document, although any other type of electronic document that includes text content meant for end-user consumption (e.g., a PDF file, a slide deck, a word processing file, a plain text file, etc.) would also apply. In response to the request, a document server 114 of server system 104 can retrieve electronic document 110 from storage 112 (or the RAM of server system 104) and can provide the retrieved document to document client 108. Upon receiving the document, document client 108 can present the electronic document to the user in a UI shown on a display of computing device 102, thereby allowing the user to read the document's text content (as well as view any additional non-text content in the document).

As noted in the Background section, one challenge with comprehending an electronic document with a large corpus of text (or a large number of such electronic documents) is that a user must generally read or skim through the entireties of the document(s), which can take a long time. This can be particularly troublesome if the amount of time available for carrying out the reading task is limited.

To address this and other similar challenges, document client 108 of FIG. 1 is enhanced to include a dynamic highlighting module 116, and server system 104 is enhanced to include a document pre-processing module 118 (comprising a text mining engine 120) that is in communication with document server 114. As explained in further detail below, dynamic highlighting module 116 can work in concert with document pre-processing module 118 to enable dynamic highlighting of terms in electronic documents (e.g., document 110) that are presented to the user of client device 102 via document client 108. In particular, modules 116 and 118 can enable dynamic highlighting based on entity selections made by the user and/or based on word selections made by the user. With these techniques, the amount of time needed by the user to explore, understand, and extract the meaning of text content in electronic documents can be significantly reduced.

It should be appreciated that system environment 100 is illustrative and not intended to limit embodiments of the present disclosure. For example, although system environment 100 contemplates a client-server architecture where document client 108 and document server 114/document pre-processing module 118 run on separate client-side and server-side machines, in alternative embodiments one or more of the server-side components may run on client device 102. In these embodiments, client device 102 may have direct access to storage 112 and may perform all document retrieval, pre-processing, and presentation functions locally on device 102.

Further, although document pre-preprocessing module 118 and document server 114 are shown as running on the same server system 104, in alternative embodiments document pre-processing module 118 and document server 114 may run on two different server systems in a distributed cluster of server systems.

Yet further, the various entities shown in system environment 100 may have other subcomponents or functions that are not specifically described. Or text mining engine 120 may be replaced by any other text analysis engine. One of ordinary skill in the art will recognize many variations, modifications, and alternatives.

2. High-Level Workflow

Figure 2:
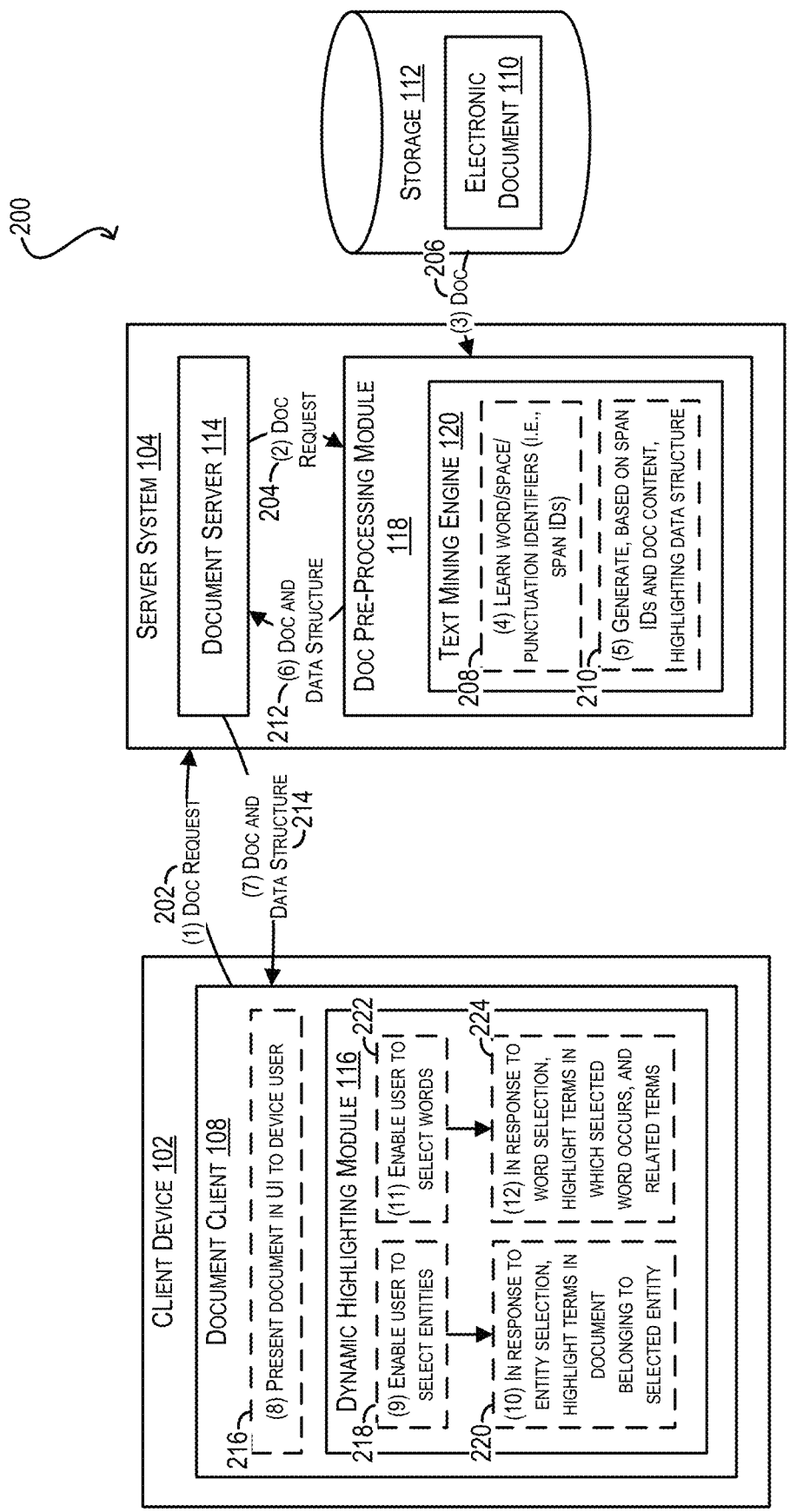
FIG. 2 depicts a workflow performed in the context of FIG. 1 for enabling dynamic highlighting of text in an electronic document according to an embodiment.

FIG. 2 depicts a high-level workflow 200 that may be carried out in the context of system environment 100 of FIG. 1 for implementing dynamic highlighting according to an embodiment.

At step (1) of workflow 200 (reference numeral 202), the user of client device 102 can send, via document client 108, a request to server system 104 for electronic document 110 stored on storage 112 (or in the RAM of server system 104). Document server 114 of server system 104 can receive the request and forward it to document pre-processing module 118 (step (2), reference numeral 204).

At steps (3) and (4) (reference numerals 206 and 208), document pre-processing module 118/text mining engine 120 can retrieve electronic document 110 from its storage location and can learn, from the document content, unique identifiers for each word, space, and punctuation in the document. For the purposes of workflow 200, it is assumed that these identifiers have been pre-assigned to the words/spaces/punctuations of electronic document 110 and are embedded in the document itself. For example, if electronic document 110 is an HTML document and includes the term "Pope John Paul," each word, space, and punctuation in "Pope John Paul" may be pre-assigned (e.g., tagged) with unique HTML span identifiers as follows:

Listing 1

```
<span id=B74>Pope</span><span id=B75>
</span><span id=B76>John</span><span id=B77>
</span><span id=B78>Paul</span>
```

Similar identifiers may be pre-assigned to every other word/space/punctuation in document 110. For simplicity of explanation, these identifiers will be referred to as "span IDs" for the remainder of this disclosure (although they are not strictly limited to being implemented/defined using the span tags shown in Listing 1).

It should be noted that, in alternative embodiments, rather than pre-assigning a SPAN ID to each word, space, or punctuation, span IDs may be pre-assigned only to words and punctuations that are deemed to be part of interesting terms in a document-term matrix maintained by text mining engine 120. This prevents the electronic document from becoming inflated with unnecessary span IDs.

Upon learning the span IDs for electronic document 110 at step (4), text mining engine 120 can generate, based on the span IDs and the document's text content, a "highlighting data structure" for the document (step (5), reference numeral 210). In various embodiments, this highlighting data structure can comprise a list of terms in electronic document 110 (each identified as a set of span IDs) and other information that may useful to dynamic highlighting module 116 for performing its highlighting functions (e.g., document relevance of each term, related terms for each term, mappings of span IDs to terms, mappings of entities to terms, etc.). In a particular embodiment, the highlighting data structure can be implemented as an XML (Extensible Markup Language) or JSON (JavaScript Object Notation) object, although other languages/formats can be used. The specific nature of this highlighting data structure is explained in further detail in Section 3 below.

Then, at steps (6) and (7) (reference numerals 212 and 214), document pre-processing module 118 can provide electronic document 110 and its associated highlighting data structure to document server 114, which can forward these items to document client 108 of client device 102.

Upon receiving electronic document 110 and the highlighting data structure, document client 108 can present the document to the device user via an appropriate UI (step (8), reference numeral 216). Further, dynamic highlighting module 116 of document client 108 can enable the user to take one of two types of actions (or in some embodiments, both actions). For example, at step (9) (reference numeral 218), dynamic highlighting module 116 can enable the user to select, via one or more UI elements such as buttons, one or more entities (i.e., term categories) relevant to electronic document 110 as defined in the highlighting data structure. In response to an entity selection, dynamic highlighting module 116 can identify all terms in the document that belong to the selected entity (per the highlighting data structure) and can highlight those identified terms in the UI presented to the user (step (10), reference numeral 220).

Alternatively or in addition, at step (11) (reference numeral 222), dynamic highlighting module 116 can enable the user to select, via a pointing mechanism such as a mouse pointer or finger, a particular word in electronic document 110. In response to a word selection, dynamic highlighting module 116 can identify all terms in the document that include the word (per the highlighting data structure), as well as any terms that are related to those terms. Dynamic highlighting module 116 can then highlight the identified terms in the UI presented to the user (step (12), reference numeral 224).

With these two highlighting mechanisms (i.e., the entity-based mechanism at steps (9)-(10) and the word-based mechanism at steps (11)-(12)), dynamic highlighting module 116 can facilitate user intake and comprehension of the document's text content in a structured and efficient way.

It should be appreciated that workflow 200 is illustrative and various modifications are possible. For example, while workflow 200 suggests that text mining engine 120 of document pre-processing module 118 generates the highlighting data structure for electronic document 110 on-demand (i.e., in response to a client request for the document), in some embodiments the highlighting data structure may be pre-generated by text mining engine 120 and maintained in storage 112 (or any other suitable storage location) in advance of receiving any client document requests. The same may apply to any pre-processing of the document that is needed to generate the highlighting data structure. This avoids the need to re-generate the highlighting data structure (or redo the pre-processing) on a per-request basis.

Further, although workflow 200 does not indicate the specific context in which the request for electronic document 110 is sent at step (1), in some embodiments this request may be sent because document 110 has been flagged as being similar to another document that the user of client device 102 has been viewing. For instance, while reading document A, the user may ask document client 108 to retrieve all similar documents to A, which causes document client 108 to request electronic document 110 as shown in workflow 200. In these embodiments, document client 108 may send, and text mining engine 120 may receive, an indication of original document A as part of the document request. Text mining engine 120 can then use this information to generate a cross-document relevancy measure (e.g., "relevance weight" or "relWeight") for each term in the highlighting data structure that indicates the degree of relevancy of the term in both the current document (i.e., document 110) and original document A, which can be used for additional highlighting features (described below).

Yet further, although workflow 200 assumes that electronic document 110 resides on the server-side of system environment 100 and is retrieved therefrom, in some embodiments electronic document 110 may be provided by client device 102 to server system 104 as part of the request at step (1). In these embodiments, server system 104 can simply pre-process the document and return it back to client device 102 in an appropriate form (and with the appropriate highlighting data structure) to enable dynamic highlighting via document client 108.

3. Data Structure Generation

Figure 3:
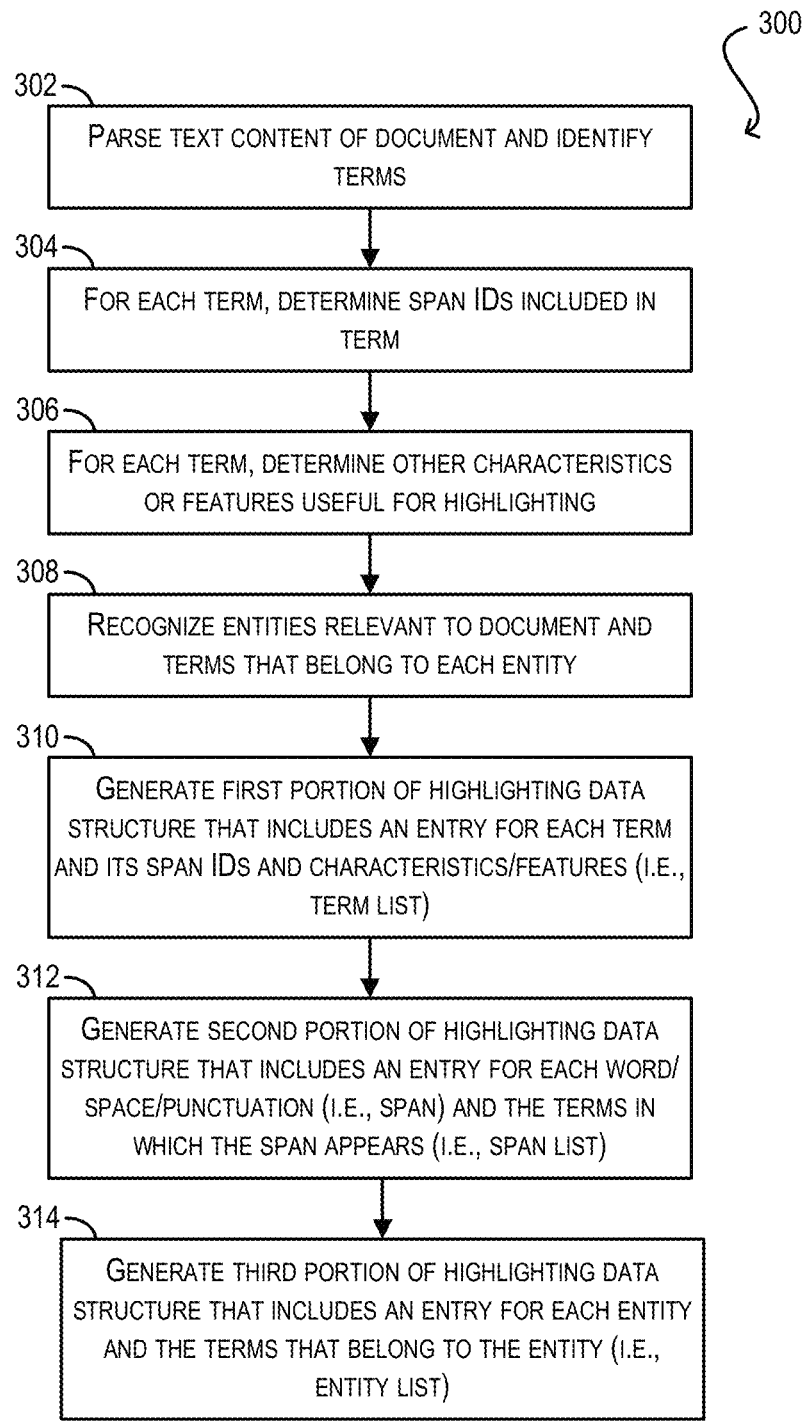
FIG. 3 depicts a flowchart for generating a highlighting data structure for an electronic document according to an embodiment.

The remainder of this disclosure presents flowcharts, example UIs, and accompanying description that provide additional details on how aspects of workflow 200 may be implemented. For example, FIG. 3 depicts a flowchart 300 that may be performed by text mining engine 120 for generating the highlighting data structure of electronic document 110 (per step (5) of workflow 200) according to an embodiment.

At block 302, text mining engine 120 can parse the text content of electronic document 110 and identify, using an internal lexicon, terms in the text content. As mentioned previously, a term is a word or combination of word(s) and/or punctuation(s) that are deemed to have some semantic significance. As part of this block, text mining engine 120 can perform filtering of the document (e.g., removing HTML tags, converting PDF files, etc.), tokenizing, part-of-speech tagging, and stemming. In addition, text mining engine 120 can assign a term ID to each identified term that is unique within the scope of electronic document 110.

At block 304, text mining engine 120 can determine, for each term identified at block 302, the span IDs of the word(s), space(s), and/or punctuation(s) that are included in the term. For instance, for the term "Pope John Paul"

previously shown in Listing 1, text mining engine 120 can determine that the span IDs included in this term are B74, B75, B76, B77, and B78.

Further, at block 306, text mining engine 120 can determine, for each term identified at block 302, other characteristics or features of the term that may be relevant for highlighting purposes. Examples of such characteristics/features can include, e.g., the word stem of the term, the frequency with which the term appears in electronic document 110 (or more particularly, the tf-idf (term frequency-inverse document frequency) weighting (i.e., "docWeight") for the term in document 110), the relevancy of the term to document 110 and other similar documents (i.e., the "relevance weight" described in Section 2), related terms in document 110, entity members in document 110 when the term itself is an entity, and so on. These other term characteristics/features can also include properties such as highlight color and highlight saturation (although these types of properties are typically a matter of document client 108 and its dynamic highlighting module 116 implementation and configuration by the user).

With respect to the "related terms" characteristic, in one embodiment text mining engine 120 can determine all of the related terms for each term in electronic document 110 by referencing a document-term matrix comprising a list of documents on one axis and constituent terms on the other axis. Using this matrix, text mining engine can determine which terms often appear together in documents, and thus should be deemed related. For instance, text mining engine 120 may find that "United Nations" and "New York" often appear together (due to the fact that the United Nations is located in New York) and therefore mark these as related terms. As another example, text mining engine 120 may find that "Muhammad Ali," "Cassius Clay," and "boxer" often appear together and therefore mark these as related terms.

Upon determining the per-term information described above, text mining engine 120 can recognize entities that are relevant to electronic document 110 and the terms identified at block 302 that belong to each entity (block 308). As mentioned previously, each entity can represent a category or type of objects, concepts, things, etc. that typically appear in text, such as people, organizations, locations, etc. The entities can also represent more abstract or linguistic types, such as nouns, verbs, adjectives, or combinations thereof (e.g., NounNoun like "penalty area," ProperNoun, AdjectiveNoun like "nongovernmental organizations," and so on).

In certain embodiments, as part of (or following) block 308, text mining engine 120 can also determine whether any of the terms identified at block 302 directly correspond to the recognized entities. For example, if text mining engine 120 recognizes the entities "Location" and "Person" as being relevant to document 110, text mining engine 120 can determine whether any of the terms identified at block 302 are the words "location" or "person." For these terms, text mining engine 120 can make note of the "entity members" of the term (i.e., the other terms in document 110 that belong to the entity corresponding to that term).

Then, at blocks 310-314, text mining engine 120 can generate the highlighting data structure with the information determined in the foregoing blocks. For example, at block 310, text mining engine 120 can create a first portion of the data structure that includes an entry for each term and its associated characteristics/features (i.e., a term list). The following is an example term list comprising a single term entry according to an embodiment:

Listing 2

```
terms": {
    "178": {"spans": ["D104"]; "root": "accruing"; "docWeight":
"0.03820"; "relWeight: "0"; "type: "Noun"; "relTerms": [ ["198",
"0.041"], ["236", "0.021"] ]; "entityMembers": ["24932",
"48724"] },
    . . .
};
```

In the example above, "178" is the term ID, "spans" identifies the span IDs for the word(s)/space(s)/punctuation(s) that make up the term, "root" identifies the word stem for the term, "docWeight" defines the tf-idf weighting for the term in the document, "relWeight" defines the cross-document relevancy of the term, "type" identifies the entity or entities to which the term belongs, "relTerms" identifies other terms in the document (by term ID) that are related to the current term, along with the degree of closeness/relation for each related term, and "entityMembers" defines the other terms in the document that belong to the entity corresponding to this term (if this term is also an entity).

At block 312, text mining engine 120 can create a second portion of the data structure that includes an entry for each word/space/punctuation in the document (i.e., span) and the terms in which these spans appear (i.e., a span list). The following is an example span list comprising three span entries according to an embodiment:

Listing 3

```
spans": {
    "D1": [12573, 12575],
    "D2": [13412, 13413, 13420],
    "D3": [10828],
    . . .
};
```

In the example above, span D1 is included in two terms identified by term IDs 12573 and 12575, span D2 is included in three terms identified by term IDs 13412, 13413, and 13420, and span D3 is included in one term identified by term ID 10828.

Finally, at block 314, text mining engine 120 can create a third portion of the data structure that includes an entry for each entity recognized in the document and the terms that belong to that entity (i.e., an entity or type list). The following is an example entity list comprising three entity entries according to an embodiment:

Listing 4

```
types": {
    "ORGANIZATION/GOVERNMENT": [8898, 12576, 15075],
    "ORGANIZATION/MEDIA": [10828],
    "PEOPLE": [13412, 8018, 289, 13412],
    . . .
};
```

In the example above, entity ORGANIZATION/GOVERNMENT comprises three terms identified by term IDs 8898, 12576, and 15075, entity ORGANIZATION/MEDIA comprises one term identified by term ID 10828, and entity PEOPLE comprises four terms identified by term IDs 13412, 8018, 289, and 13412.

4. Dynamic Highlighting Based on Entity Selection

Figure 4:
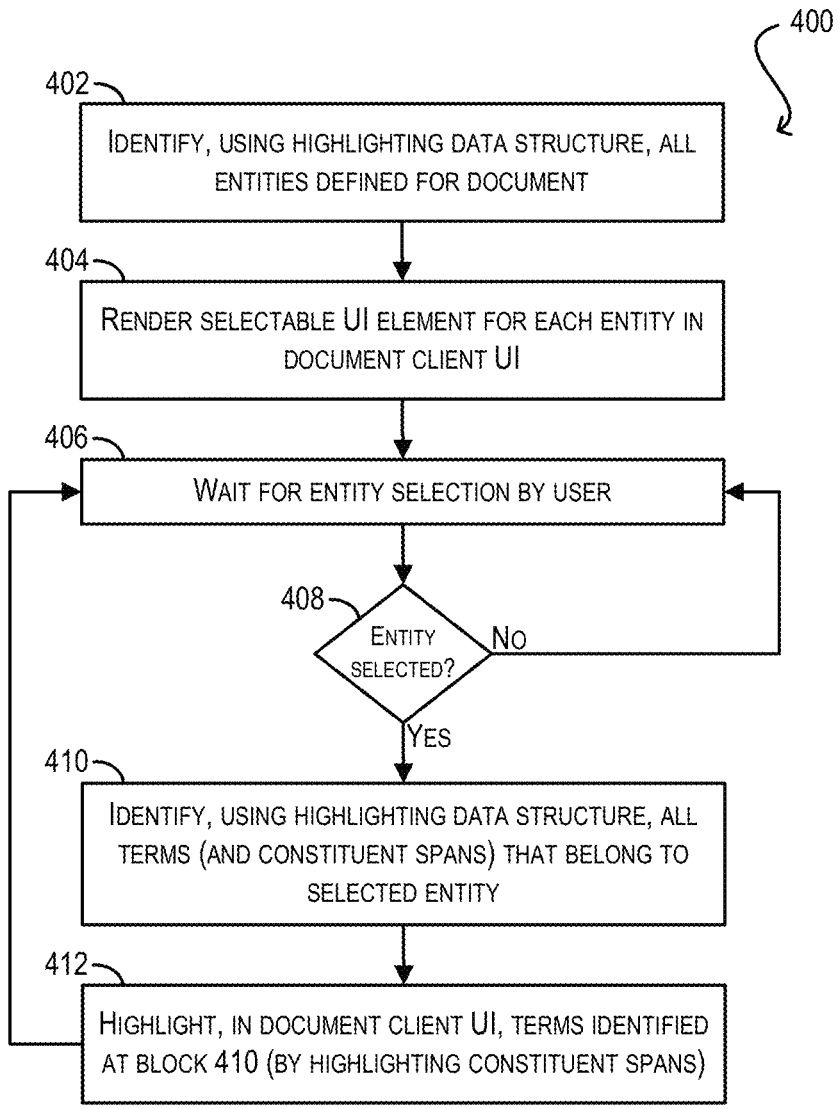
FIG. 4 depicts a flowchart for performing entity-based dynamic highlighting according to an embodiment.

FIG. 4 depicts a flowchart 400 that provides additional details on how dynamic highlighting module 116 can carry out entity-based highlighting of electronic document 110 (per steps (9) and (10) of workflow 200) according to an embodiment.

At block 402, dynamic highlighting module 116 can identify, using the highlighting data structure received at step (7) of workflow 200, all of the entities defined for electronic document 110. For example, in one embodiment, dynamic highlighting module 116 can inspect the entity list of the highlighting data structure and extract all of the entities defined in the entity list.

Figure 5A:
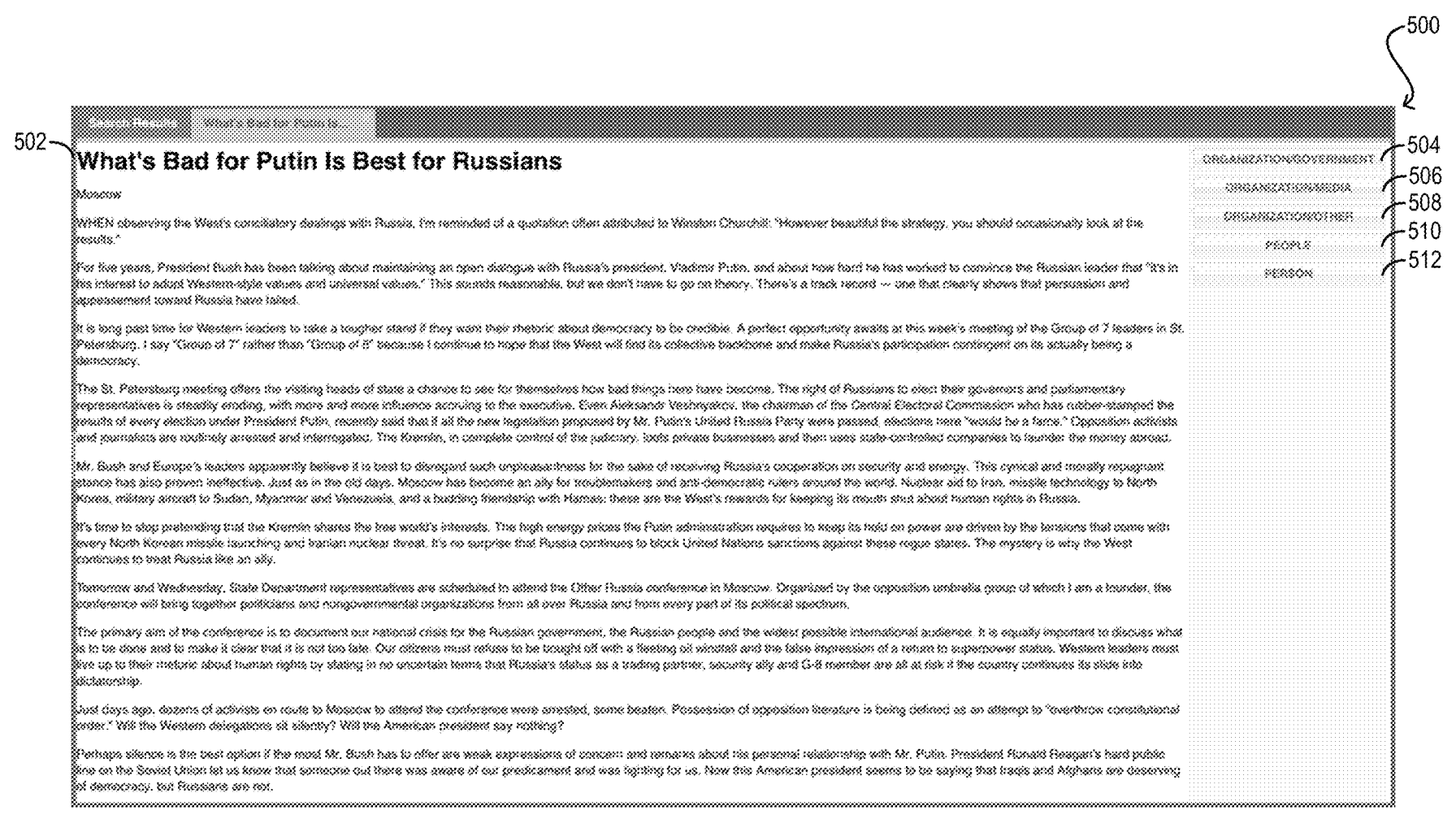

At block 404, dynamic highlighting module 116 can render, in document client 108's UI, a selectable UI element (e.g., button, checkbox, radio button, selection box, etc.) for each entity identified at block 402. Dynamic highlighting module 116 can further register these UI elements so that module 116 is notified when they are activated. For instance, FIG. 5A illustrates an example document client UI 500 that includes a document presentation section 502 and five buttons 504, 506, 508, 510, and 512 that correspond to entities "ORGANIZATION/GOVERNMENT," "ORGANIZATION," "ORGANIZATION/MEDIA," "ORGANIZATION/OTHER," "PEOPLE," and "PERSON" respectively. Dynamic highlighting module 116 can then wait for user selection of an entity via the rendered UI elements (block 406).

If dynamic highlighting module 116 determines that the user has selected an entity by activating its corresponding UI element (block 408), module 116 can identify, using the highlighting data structure, all terms and constituent words/spaces/punctuations (i.e., spans) in electronic document 110 that belong to the selected entity (block 410). Block 410 can involve, e.g., examining the entry for the selected entity in the entity list of the highlighting data structure, determining the term IDs associated with the entity, and examining the entry for each term ID in the term list to retrieve its associated span IDs.

Figure 5B:
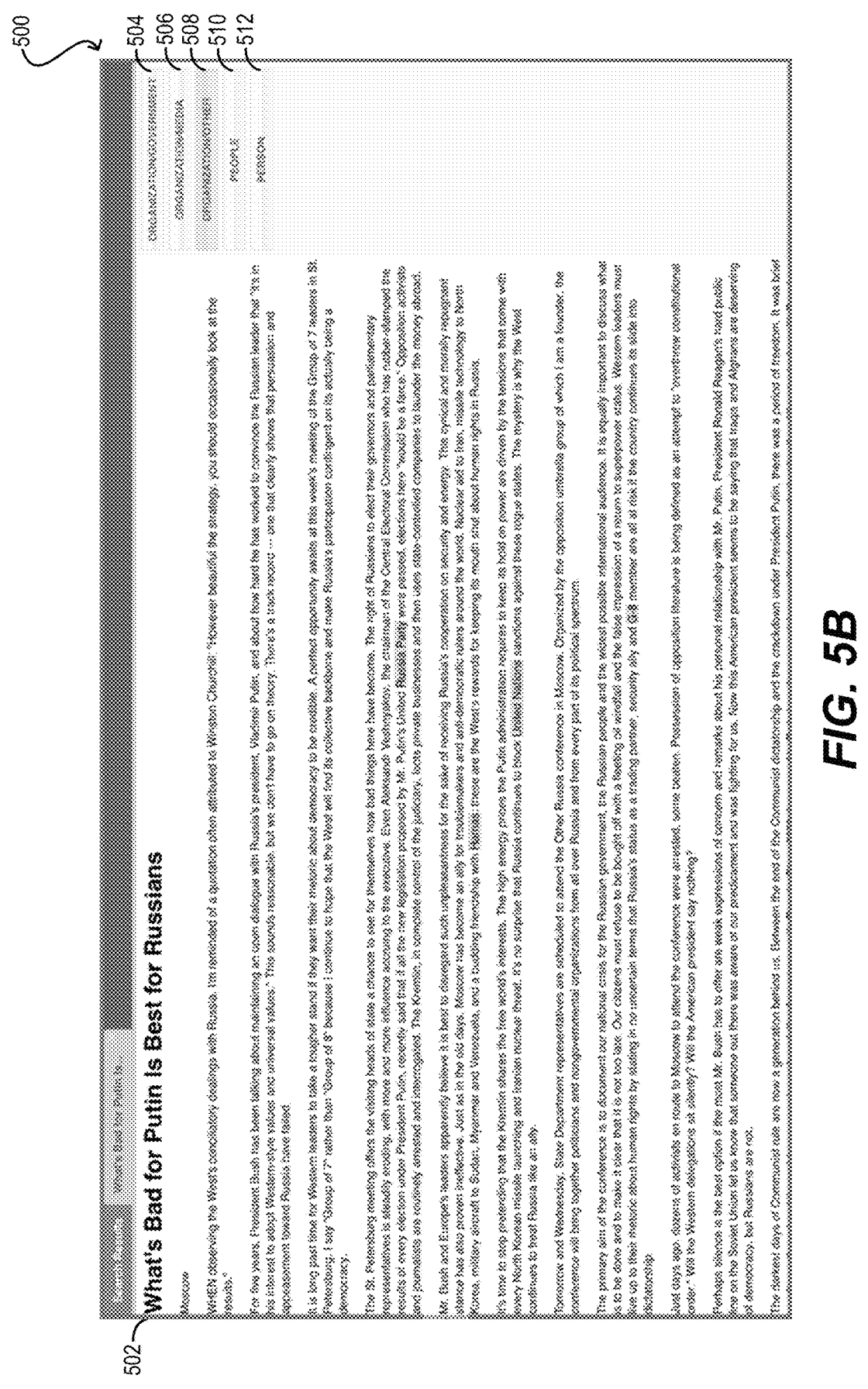

Dynamic highlighting module 116 can thereafter highlight, in document client 108's UI, the identified terms by highlighting the words/spaces/punctuations of the terms as identified by their constituent span IDs (block 412). For example, FIG. 5B illustrates a version of UI 500 in which the ORGANIZATION/OTHER entity has been selected, and thus the document terms "Russia Party," "Hamas," "United Nations," and "G-8" (which all belong to this entity) are highlighted in document presentation section 502.

In certain embodiments, the specific way in which each identified term is highlighted at block 412 (e.g., color and/or saturation used) may differ based on one or more rules. For instance, in a particular embodiment, the saturation of each highlighted term may vary depending on how frequently the term appears in the document (as defined by the docWeight characteristic discussed in Section 3). In other embodiments, the appearance of each highlighted term may vary based on other term characteristics/features or user-defined policy.

Figure 5C:
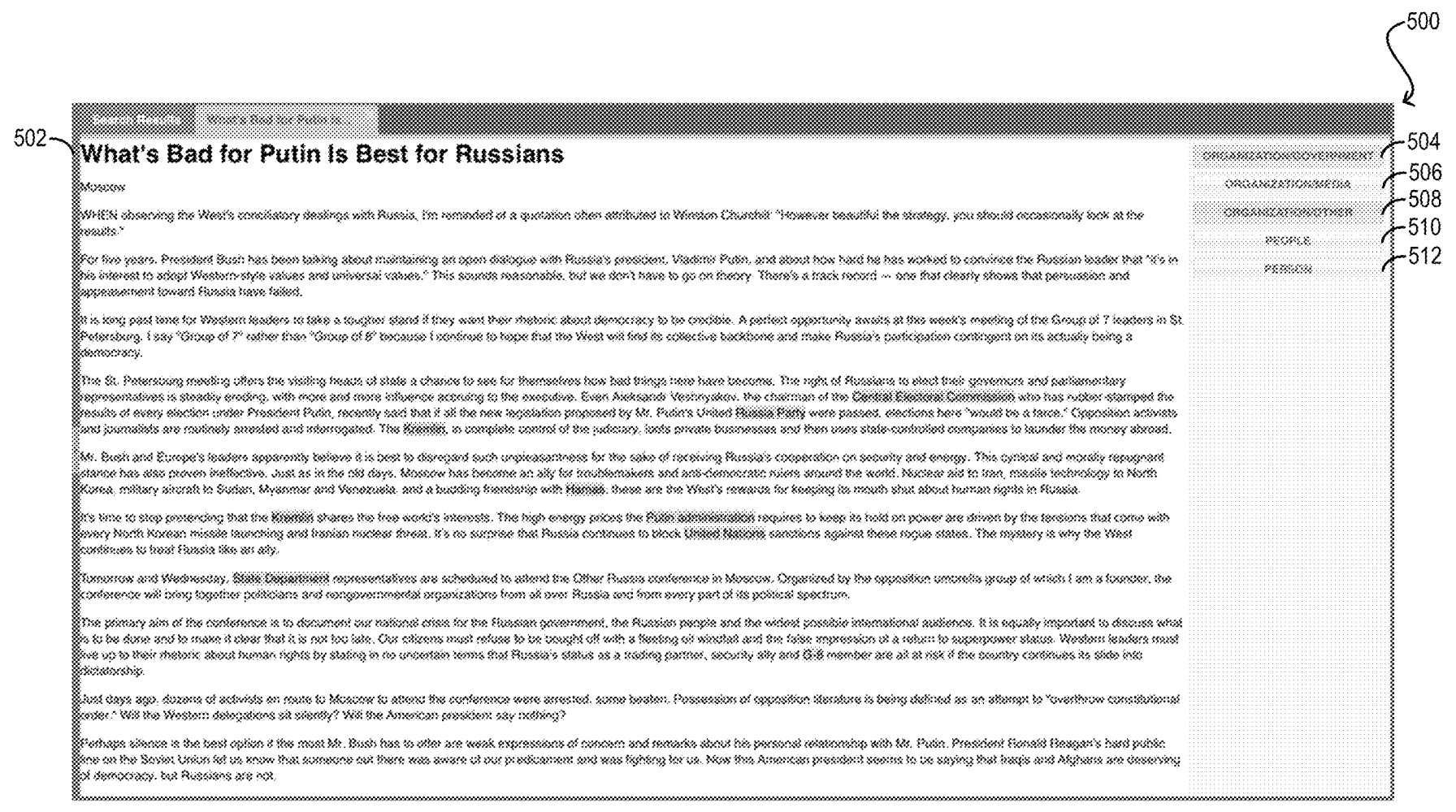

Once dynamic highlighting module 116 has completed its highlighting operation at block 412, module 116 can return to block 406 in order to wait for further user entity selections. If a further selection is received, dynamic highlighting module 116 can repeat blocks 408-412 and thereby highlight additional terms in electronic document 110 relating to the newly selected entity. This scenario is depicted in FIG. 5C, which shows that the user has selected the ORGANIZATION/GOVERNMENT entity in UI 500 (in addition to the previously selected ORGANIZATION/OTHER entity), resulting in the highlighting of additional terms "Kremlin," "Putin administration," and "State Department." This loop can continue until the user closes document client 108 or requests a new document.

It should be appreciated that flowchart 400 is illustrative and various modifications are possible. For example, while not explicitly shown, if the user de-selects a previously selected entity UI element, dynamic highlighting module 116 can accordingly turn off the highlighting for the terms belonging to that entity.

Further, in some embodiments, dynamic highlighting module 116 may render an additional, selectable UI element for a predefined "similarities" entity. This may occur in situations where the user has requested the current document from the context of a different, original document (via, e.g., a "get similar documents" request) as mentioned in Section 2 above. An example of this additional UI element is shown in UI 600 of FIG. 6 (identified by reference numeral 602). In these embodiments, if the user selects the "similarities" entity by activating its corresponding UI element, dynamic highlighting module 116 can highlight all terms in the document that are determined to have a non-zero degree of cross-document relevancy between the current document and the original document. Module 116 can determine the cross-document relevancy for each term by, e.g., referring to the "relWeight" term characteristic shown in Listing 2. Thus, this feature enables the user to quickly understand how the current document is similar to the original document.

5. Dynamic Highlighting Based on Word Selection

Figure 7A:
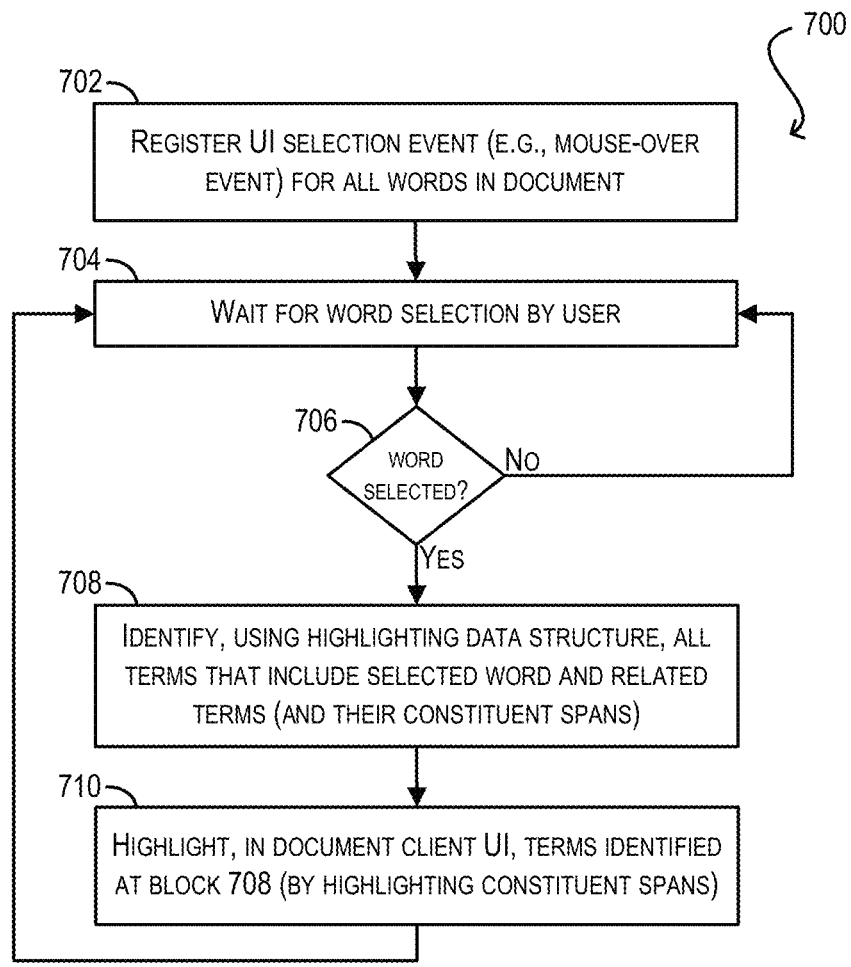
FIGS. 7A and 7B depict flowcharts for performing word-based dynamic highlighting according to an embodiment.
Figure 7B:
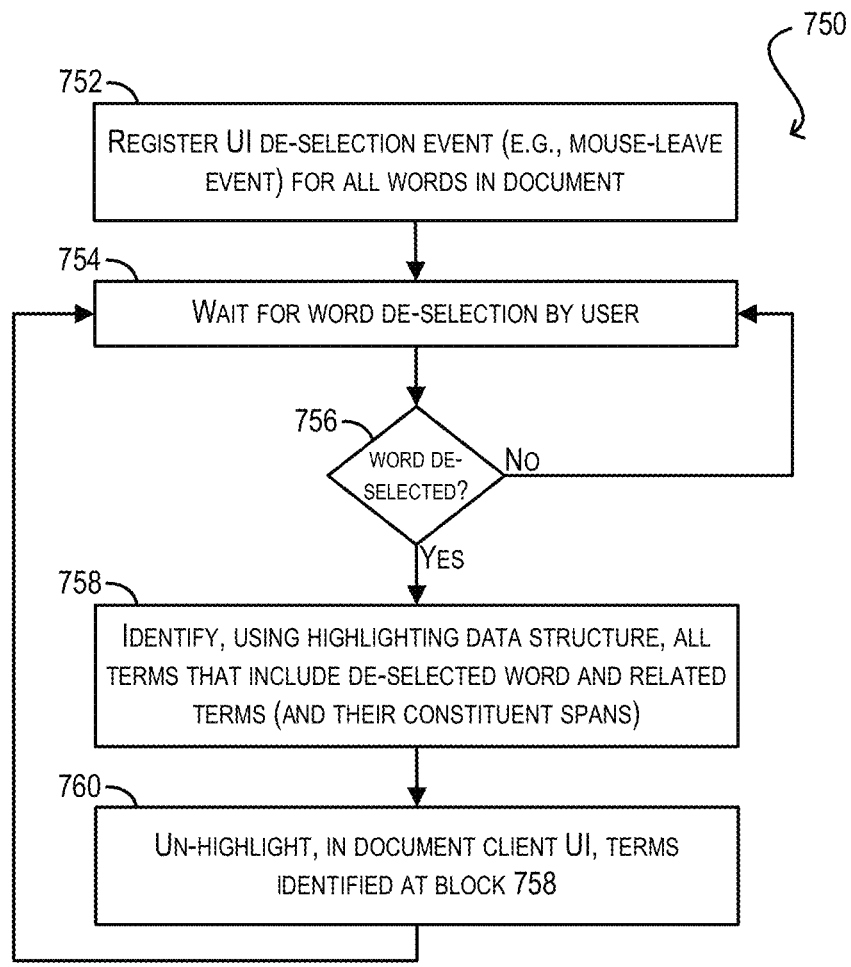

FIGS. 7A and 7B depict flowcharts 700 and 750 that provide additional details on how dynamic highlighting module 116 can carry out word-based highlighting of electronic document 110 (per steps (11) and (12) of workflow 200) according to an embodiment.

At block 702 of FIG. 7A, dynamic highlighting module 116 can register a UI selection event (e.g., a mouse-over event or any other selection event as appropriate for the input mechanism(s) of client device 102) for all of the words defined in electronic document 110. Module 116 can perform this step by registering the span ID of each word. Dynamic highlighting module 116 can then wait for user selection of a word via the registered selection event (block 704).

If dynamic highlighting module 116 determines that the user has selected a word by triggering the registered selection event (e.g., by mousing-over a particular word) (block 706), module 116 can identify, using the highlighting data structure, all terms in electronic document 110 that include that word, as well as all terms in the document that are related to those terms and/or all terms in the document that belong to an entity corresponding to the term (if the term is also an entity) (block 708). Block 708 can involve, e.g., determining the span ID of the selected word, examining the entry for this span ID in the span list of the highlighting data structure to retrieve all terms (by term ID) in which the span ID occurs, and then examining the entry for each retrieved term in the term list to determine its constituent span IDs, related terms, and entity members.

Figure 8:
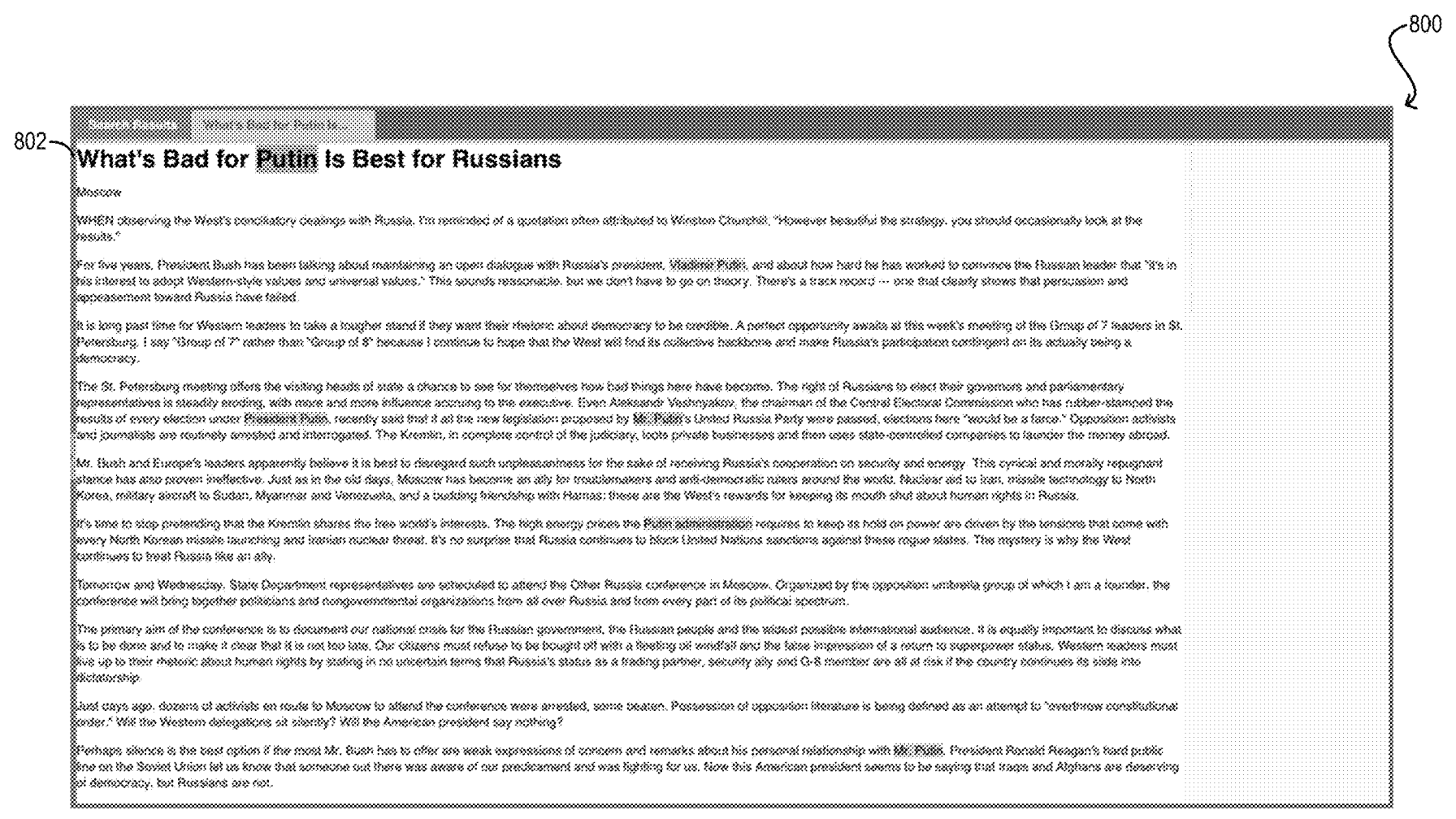

Dynamic highlighting module 116 can thereafter highlight, in document client 108's UI, the identified terms by highlighting the words/spaces/punctuations of the terms as identified by their constituent span IDs (block 710). To illustrate this, FIG. 8 depicts an example document client UI 800 where the user has moused-over the word "Putin" in document presentation section 802. As a result, all terms including "Putin" are highlighted in the presented document. As with the entity-based highlighting discussed with respect to FIG. 4, the manner in which each term is highlighted at block 710 (e.g., color and/or saturation) can vary based on one or more rules.

After block 710, module 116 can return to block 704 in order to wait for further word selections by the user. If a further selection is received, dynamic highlighting module 116 can repeat blocks 706-710 for the newly selected word. This loop can continue until the user closes document client 108 or requests a new document.

FIG. 7B depicts a parallel flowchart 750 that can be executed concurrently with flowchart 700 of FIG. 7A and is used to "un-highlight" terms that are highlighted via flowchart 700. At block 752 of FIG. 7B, dynamic highlighting module 116 can register a UI de-selection event (e.g., a mouse-leave event) for all of the words defined in electronic document 110. Dynamic highlighting module 116 can then wait for the user to de-select, via the registered de-selection event, a word that was previously selected at block 706 of FIG. 7A (block 754).

If dynamic highlighting module 116 determines that the user has de-selected a previously selected word by triggering the registered de-selection event (e.g., by moving the mouse away from the selected word) (block 756), module 116 can identify, using the highlighting data structure, all terms in electronic document 110 that include that word, as well as all related terms and entity members (block 758). Dynamic highlighting module 116 can then "un-highlight," in document client 108's UI, the identified terms by undoing the previous highlighting of the words/spaces/punctuations in the terms (block 760).

Finally, dynamic highlighting module 116 can return to block 754 in order to wait for further word de-selections by the user. If a further de-selection is received, dynamic highlighting module 116 can repeat blocks 756-760 for the newly de-selected word. This loop can continue until the user closes document client 108 or requests a new document.

Figure 9:
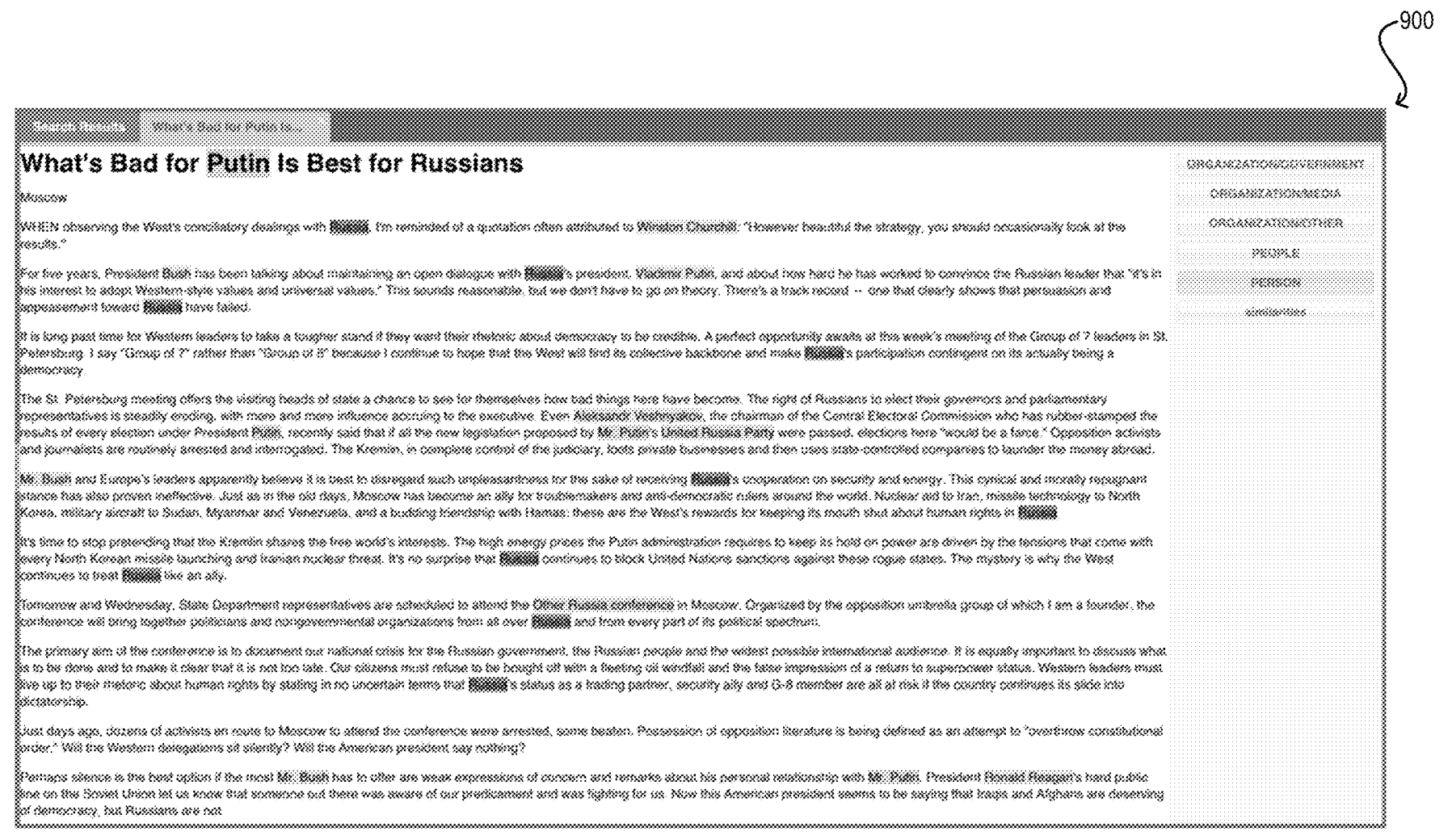

As mentioned previously, in some embodiments, the word-based highlighting described in FIG. 7 can be used in conjunction with the entity-based highlighting described in FIG. 4. This is shown in example UI 900 of FIG. 9, where the user has both selected the "PERSON" entity and moused-over the word "Russia." Thus, all terms belonging to the PERSON entity are highlighted using a first highlight color, and all terms including "Russia" (and related terms) are highlighted using a second highlight color.

Figure 10:
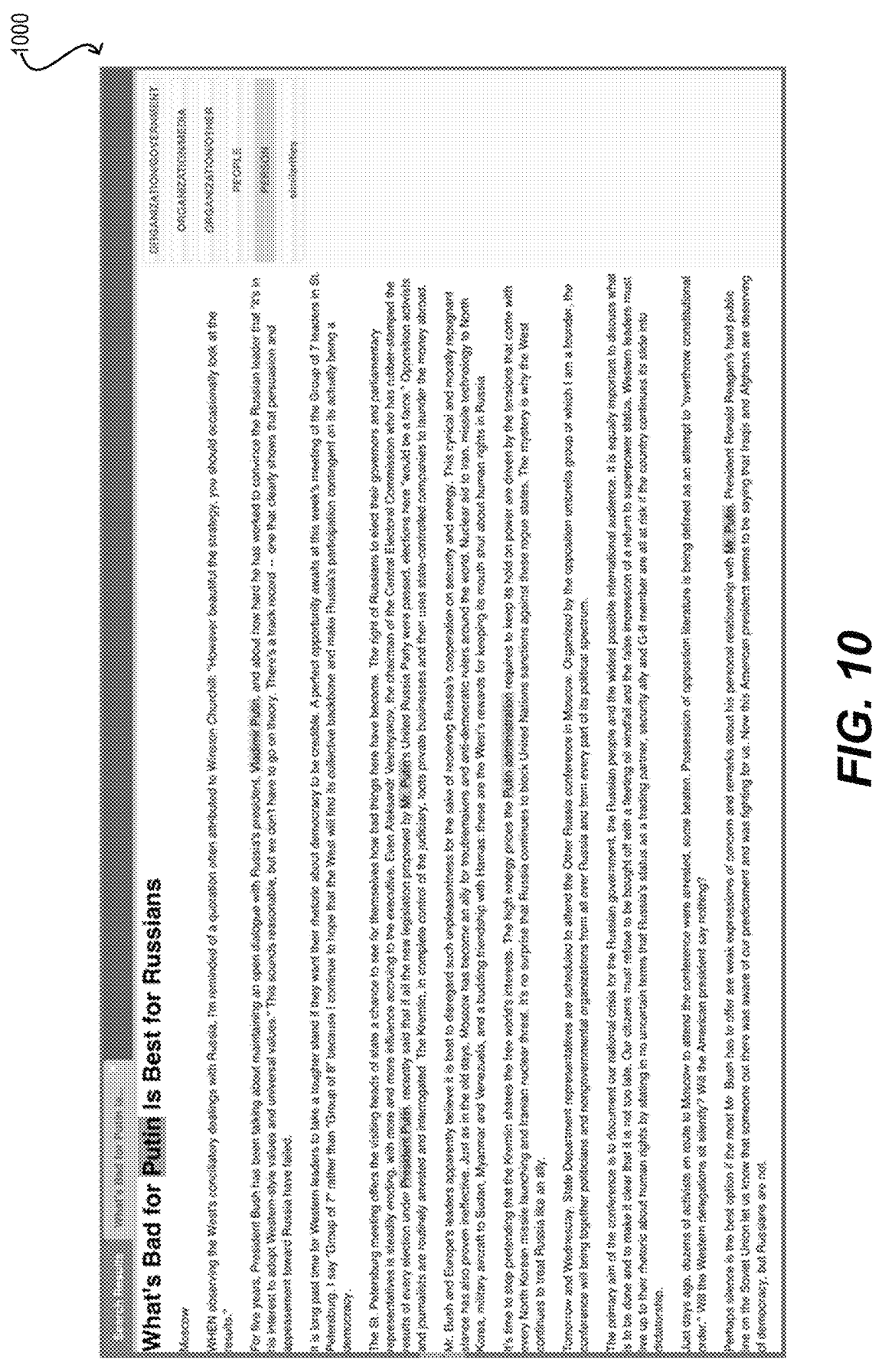

In further embodiments, in cases where the entity UI elements are rendered in the UI and the user selects a word that belongs to a particular entity, dynamic highlighting module 116 can also highlight the entity element itself to show this relationship. For example, in UI 1000 of FIG. 10, the user has moused-over the word "Putin," which causes the entity button for the PERSON entity to be highlighted (because Putin belongs to this entity in the highlighting data structure). Note that this is performed in addition to highlighting all terms that include "Putin" in the document presentation section.

In yet further embodiments, document client 108 can allow (via, e.g., UI elements such as checkboxes, etc.) user control over what types of terms are highlighted in response to a word selection. For instance, one such UI element can be used to turn-on or turn-off the highlighting of related terms. Another such UI element can be used to turn-on or turn-off the highlighting of entity members (if applicable to the selected word/term).

6. Computer System

Figure 11:
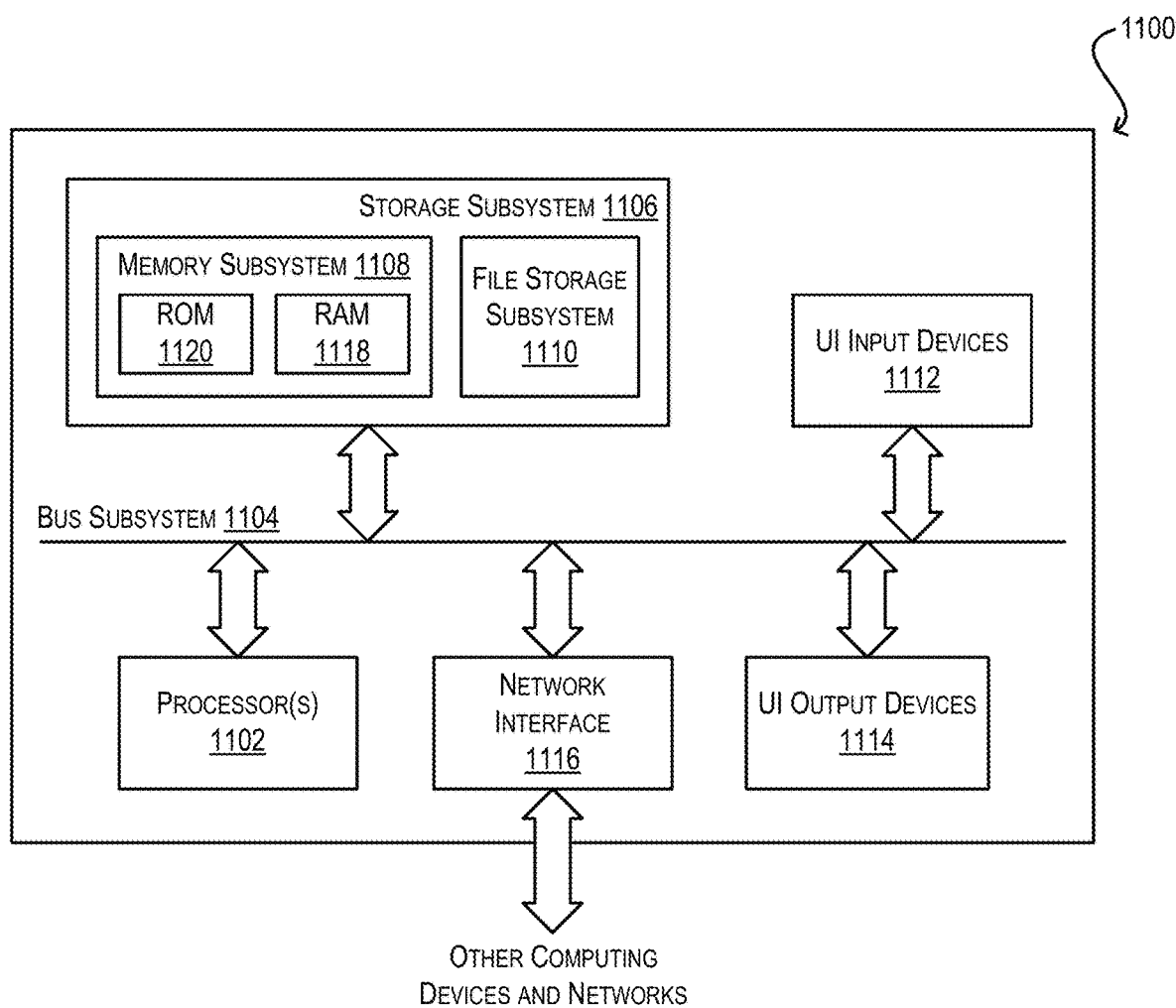
FIG. 11 depicts an example computer system according to an embodiment.

FIG. 11 depicts an example computer system 1100 according to an embodiment. Computer system 1100 may be used to implement any of the computing devices/systems (e.g., client device 102 and server system 104) described in the foregoing disclosure.

As shown, computer system 1100 can include one or more processors 1102 that communicate with a number of peripheral devices via a bus subsystem 1104. These peripheral devices can include a storage subsystem 1106 (comprising a memory subsystem 1108 and a file storage subsystem 1110), user interface input devices 1112, user interface output devices 1114, and a network interface subsystem 1116.

Bus subsystem 1104 can provide a mechanism for letting the various components and subsystems of computer system 1100 communicate with each other as intended. Although bus subsystem 1104 is shown schematically as a single bus, alternative embodiments of the bus subsystem can utilize multiple busses.

Network interface subsystem 1116 can serve as an interface for communicating data between computer system 1100 and other computing devices or networks. Embodiments of network interface subsystem 1116 can include wired (e.g., coaxial, twisted pair, or fiber optic Ethernet) and/or wireless (e.g., Wi-Fi, cellular, Bluetooth, etc.) interfaces.

User interface input devices 1112 can include a touch-screen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computer system 1100.

User interface output devices 1114 can include a display subsystem (e.g., a flat-panel display), an audio output device (e.g., a speaker), and/or the like. In general, use of the term "output device" is intended to include all possible types of devices and mechanisms for outputting information from computer system 1100.

Storage subsystem 1106 can include a memory subsystem 1108 and a file/disk storage subsystem 1110. Subsystems 1108 and 1110 represent non-transitory computer-readable storage media that can store program code and/or data that provide the functionality of various embodiments described herein.

Memory subsystem 1108 can include a number of memories including a main random access memory (RAM) 1118 for storage of instructions and data during program execution and a read-only memory (ROM) 1120 in which fixed instructions are stored. File storage subsystem 1110 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and many other configurations having more or fewer components than computer system 1100 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the dynamic highlighting techniques disclosed herein and as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   receiving, by a computing device from a server system, an electronic document and a data structure associated with the electronic document, the data structure comprising:
   for each word, punctuation, and space in the electronic document, a span entry including:
   a span identifier identifying the word, punctuation, or space; and
   a set of term identifiers identifying terms in the electronic document that include the word, punctuation, or space identified by the span identifier;
   a list of term entries, each term entry including a term identifier identifying a term in the electronic document, a set of span identifiers corresponding to the term, and a set of characteristics of the term; and
   a list of entity entries, each entity entry identifying an entity corresponding to a topic category that is relevant to the electronic document and a set of term identifiers of terms that belong to the topic category;
   presenting, by a computing device, the electronic document to a user via a user interface (UI) of the computing device, the presenting comprising:
   extracting one or more entities identified in the list of entity entries; and
   for each of the one or more entities:
   rendering, in the UI of the computing device, a selectable UI element corresponding to the entity; and
   registering the selectable UI element so that the computing device is notified when the selectable UI element is activated by the user;
   receiving, by the computing device from the user, a selection of a first entity in the one or more entities via an activation of the first entity's selectable UI element;
   in response to receiving the selection of the first entity, automatically highlighting one or more first terms in the presented electronic document that belong to the first entity using a first color, wherein automatically highlighting the one or more first terms comprises:
   determining a first entity entry in the list of entity entries that identifies the first entity;
   retrieving the set of term identifiers included in the first entity entry; and
   for each term identifier in the retrieved set of term identifiers:
   retrieving a term entry in the list of term entries that includes the term identifier;
   retrieving the set of span identifiers included in the retrieved term entry; and
   highlighting, in the UI of the computing device, each word, punctuation, and space identified by the set of span identifiers in accordance with one or more of the set of characteristics included in the term entry;
   receiving, by the computing device from the user, a selection of a word in the electronic document;
   in response to receiving the selection of the word, automatically highlighting one or more second terms in the presented electronic document that include the word using a second color, wherein at least one term in the one or more second terms includes one or more other words in addition to the word;
   determining a second entity in the one or more entities to which the word belongs; and
   automatically highlighting the second entity's selectable UI element.

2. The method of claim 1 further comprising:
   receiving, from the user, a selection of a second entity in the one or more entities via an activation of the second entity's selectable UI element; and
   in response to the receiving the selection of the second entity, automatically highlighting one or more third terms in the presented electronic document that belong to the second entity using a third color.

3. The method of claim 1 wherein the data structure is generated by a text mining engine of the server system in response to a request for the electronic document.

4. The method of claim 1 wherein automatically highlighting the one or more second terms in the presented electronic document that include the word comprises:
   identifying a first span entry in the data structure corresponding to the word; and
   retrieving the set of term identifiers included in the first span entry.

5. The method of claim 4 wherein automatically highlighting the one or more second terms in the presented electronic document that include the word further comprises, for each term identifier in the set of term identifiers included in the first span entry:
   retrieving a term entry in the list of term entries corresponding to the term identifier;
   retrieving the set of span identifiers included in the retrieved term entry; and
   highlighting each word, punctuation, and space identified by the set of span identifiers in accordance with one or more of the set of characteristics included in the term entry.

6. The method of claim 1 wherein the set of characteristics included in the term entry for each term comprises a document weight for the term, the document weight indicating how often the term appears in the electronic document.

7. The method of claim 6 wherein automatically highlighting the one or more first terms comprises:
   adjusting highlight saturation of each term based on the document weight of the term.

8. The method of claim 1 wherein the set of characteristics included in the term entry for each term comprises a list of related terms in the electronic document that are deemed related to the term.

9. The method of claim 8 further comprising:
   in response to receiving the selection of the word, automatically highlighting one or more third terms in the presented electronic document that are deemed related to the one or more second terms,
   wherein the one or more third terms are determined based on the list of related terms included in the term entry of each of the one or more second terms.

10. The method of claim 1 wherein the set of characteristics included in each term entry further comprises a cross-document relevancy weight for the term, the cross-document relevancy weight indicating a degree of relevancy of the term to the electronic document and one or more other, similar documents.

11. The method of claim 10 further comprising:
receiving a selection of a predefined similarities entity from the user; and
automatically highlighting all terms in the electronic document whose cross-document relevancy weight is greater than zero.

12. A non-transitory computer readable medium having stored thereon program code executable by a computing device, the program code comprising:
code that causes the computing device to receive, from a server system, an electronic document and a data structure associated with the electronic document, the data structure comprising:
for each word, punctuation, and space in the electronic document, a span entry including:
a span identifier identifying the word, punctuation, or space; and
a set of term identifiers identifying terms in the electronic document that include the word, punctuation, or space identified by the span identifier;
a list of term entries, each term entry including a term identifier identifying a term in the electronic document, a set of span identifiers corresponding to the term, and a set of characteristics of the term; and
a list of entity entries, each entity entry identifying an entity corresponding to a topic category that is relevant to the electronic document and a set of term identifiers of terms that belong to the topic category;
code that causes the computing device to present the electronic document to a user via a user interface (UI) of the computing device, the presenting comprising:
extracting one or more entities identified in the list of entity entries; and
for each of the one or more entities:
rendering, in the UI of the computing device, a selectable UI element corresponding to the entity; and
registering the selectable UI element so that the computing device is notified when the selectable UI element is activated by the user;
code that causes the computing device to receive, a user selection of an entity in the one or more entities via an activation of the entity's selectable UI element; and
code that causes the computing device to, in response to receiving the user selection of the entity, automatically highlight one or more first terms in the presented electronic document that belong to the entity, wherein automatically highlighting the one or more first terms comprises:
determining a first entity entry in the list of entity entries that identifies the entity;
retrieving the set of term identifiers included in the first entity entry; and
for each term identifier in the retrieved set of term identifiers:
retrieving a term entry in the list of term entries that includes the term identifier;
retrieving the set of span identifiers included in the retrieved term entry; and
highlighting, in the UI of the computing device, each word, punctuation, and space identified by the set of span identifiers in accordance with one or more of the set of characteristics included in the term entry;
code that causes the computing device to receive, from the user, a selection of a word in the electronic document;
in response to receiving the selection of the word, code that causes the computing device to automatically highlight one or more second terms in the presented electronic document that include the word using a second color, wherein at least one term in the one or more second terms includes one or more other words in addition to the word;
code that causes the computing device to determine a second entity in the one or more entities to which the word belongs; and
code that causes the computing device to automatically highlight the second entity's selectable UI element.

13. A computing device comprising:
a processor;
a display; and
a memory having stored thereon program code that, when executed by the processor, causes the processor to:
receive, from a server system, an electronic document and a data structure associated with the electronic document, the data structure comprising:
for each word, punctuation, and space in the electronic document, a span entry including:
a span identifier identifying the word, punctuation, or space; and
a set of term identifiers identifying terms in the electronic document that include the word, punctuation, or space identified by the span identifier;
a list of term entries, each term entry including a term identifier identifying a term in the electronic document, a set of span identifiers corresponding to the term, and a set of characteristics of the term; and
a list of entity entries, each entity entry identifying an entity corresponding to a topic category that is relevant to the electronic document and a set of term identifiers of terms that belong to the topic category;
present, on the display, the electronic document to a user via a user interface (UI) of the computing device, the presenting comprising:
extracting one or more entities identified in the list of entity entries; and
for each of the one or more entities:
rendering, in the UI of the computing device, a selectable UI element corresponding to the entity; and
registering the selectable UI element so that the computing device is notified when the selectable UI element is activated by the user;
receive, a user selection of an entity in the one or more entities via an activation of the entity's selectable UI element; and
in response to receiving the user selection of the entity, automatically highlight one or more first terms in the presented electronic document that belong to the entity, wherein automatically highlighting the one or more first terms comprises:
determining a first entity entry in the list of entity entries that identifies the entity;
retrieving the set of term identifiers included in the first entity entry; and for each term identifier in the retrieved set of term identifiers:
  retrieving a term entry in the list of term entries that includes the term identifier;
  retrieving the set of span identifiers included in the retrieved term entry;
  highlighting, in the UI of the computing device, each word, punctuation, and space identified by the set of span identifiers in accordance with one or more of the set of characteristics included in the term entry;
receive, from the user, a selection of a word in the electronic document;
in response to receiving the selection of the word, automatically highlight one or more second terms in the presented electronic document that include the word using a second color, wherein at least one term in the one or more second terms includes one or more other words in addition to the word;
determine a second entity in the one or more entities to which the word belongs; and
automatically highlight the second entity's selectable UI element.

* * * * *